United States Patent [19]

March et al.

[11] 4,373,658
[45] Feb. 15, 1983

[54] HIGH PRESSURE CONDENSATION SOLDERING, FUSING OR BRAZING

[75] Inventors: Edward J. March, Lower Makefield Township, Bucks County, Pa.; Raymond J. Newman, Lawrence Township, Mercer County, N.J.

[73] Assignee: Western Electric Co., Inc., New York, N.Y.

[21] Appl. No.: 237,204

[22] Filed: Feb. 23, 1981

[51] Int. Cl.³ .................... B23K 3/00; F27D 7/02
[52] U.S. Cl. .................................. 228/242; 34/34; 34/231; 134/182; 432/194
[58] Field of Search ............. 228/242; 34/22, 29, 34/34, 231; 432/194; 134/182, 31

[56] References Cited

U.S. PATENT DOCUMENTS

| | | | |
|---|---|---|---|
| 918,335 | 4/1909 | Lain | 34/231 X |
| 1,821,943 | 9/1931 | McClatchie | 53/440 X |
| 2,897,778 | 8/1959 | Held et al. | 134/31 X |
| 3,343,477 | 9/1967 | Ekstam | 99/443 R |
| 3,543,776 | 12/1970 | Layton | 134/182 X |
| 3,866,307 | 2/1975 | Pfahl, Jr. | 228/180 R X |
| 4,253,247 | 3/1981 | Bergstrom | 34/34 X |

*Primary Examiner*—Kenneth J. Ramsey
*Attorney, Agent, or Firm*—D. J. Kirk

[57] ABSTRACT

A high pressure steam condensation soldering facility (10) is described. The facility (10) incorporates a chamber (12) having a centrally located heat processing zone (45) into which high pressure steam is injected to reflow solder on articles (43) therein. A baffle (41) having a conical top portion (51) with a plurality of apertures (52) therein permits controlled amounts of the steam to pass therethrough while redirecting a portion of the steam along the wall (16) of the chamber (12) to interpose a shield of steam between the wall and uniformly heated processing zone (45).

7 Claims, 3 Drawing Figures

HIGH PRESSURE CONDENSATION SOLDERING, FUSING OR BRAZING

TECHNICAL FIELD

The instant invention relates to techniques for soldering, fusing or brazing articles. In particular, articles are soldered, fused or brazed by condensing hot saturated vapor thereon.

BACKGROUND OF THE INVENTION

In the prior art it is well known to solder, fuse or braze articles by condensing hot saturated vapor of a heat transfer fluid thereon at atmospheric pressure. This method is described in detail in U.S. Pat. No. 30,399 which issued on Sept. 9, 1980 and is assigned to Western Electric Company and Bell Telephone Laboratories, Inc. This patent also indicates that such operations can also be accomplished at other than atmospheric pressure.

Suggestions have been made to implement such a concept by generating a body of high pressure steam in a boiler and rapidly injecting the steam into an enclosed processing vessel containing articles to be soldered. Advantageously, steam has a much higher heat transfer rate, is more stable, non-toxic and less expensive than vapor of heat transfer fluids heretofore used at atmospheric pressure. Although the suggested technique can be used to solder articles within the vessel, problems have been encountered when attempts have been made to implement such concepts.

In practice it was found that as the high pressure jet of steam enters the processing vessel it impinges on and moves small articles which are to be soldered. Additionally, the thick metal walls of the process vessel act as a large heat sink which condenses a substantial percentage of the incoming vapor thereon, leading to the establishment of large temperature variations within the process vessel resulting in a non-uniform vapor heating environment in which articles are to be soldered. The article movement and non-uniform heating of the processed article results in poor soldering quality and attendant low yield.

Accordingly, there is a need for a high pressure vapor condensation process and apparatus which provides a uniform vapor heating environment for soldering, fusing or brazing articles.

SUMMARY OF THE INVENTION

The instant invention overcomes the foregoing problem of providing a vapor heating environment, having a substantially uniform temperature distribution, within a high pressure vapor condensation heating chamber by thermally isolating a processing zone from the chamber wall by forming a shield of hot vapor along the surface of the wall. Additionally, high pressure vapor is simultaneously directed into said heat processing zone through a baffle arrangement.

Apparatus to implement the instant method comprises means for forming a shield of high pressure vapor between the chamber wall and the heat processing zone. Additionally, means are provided for simultaneously directing high pressure vapor into the processing zone through the baffle as the shield is being formed.

DETAILED DESCRIPTION

The instant invention will be described in terms of soldering articles. Such description is for purposes of exposition and not for limitation for the instant techniques can also be implemented in other processes such as fusing or brazing or the like where materials are brought to elevated temperatures. Additionally, in an exemplary embodiment, high pressure steam is used to solder articles however, high pressure vapor of other heat transfer fluids may be used depending on the particular application or article to be processed.

Figure 1:
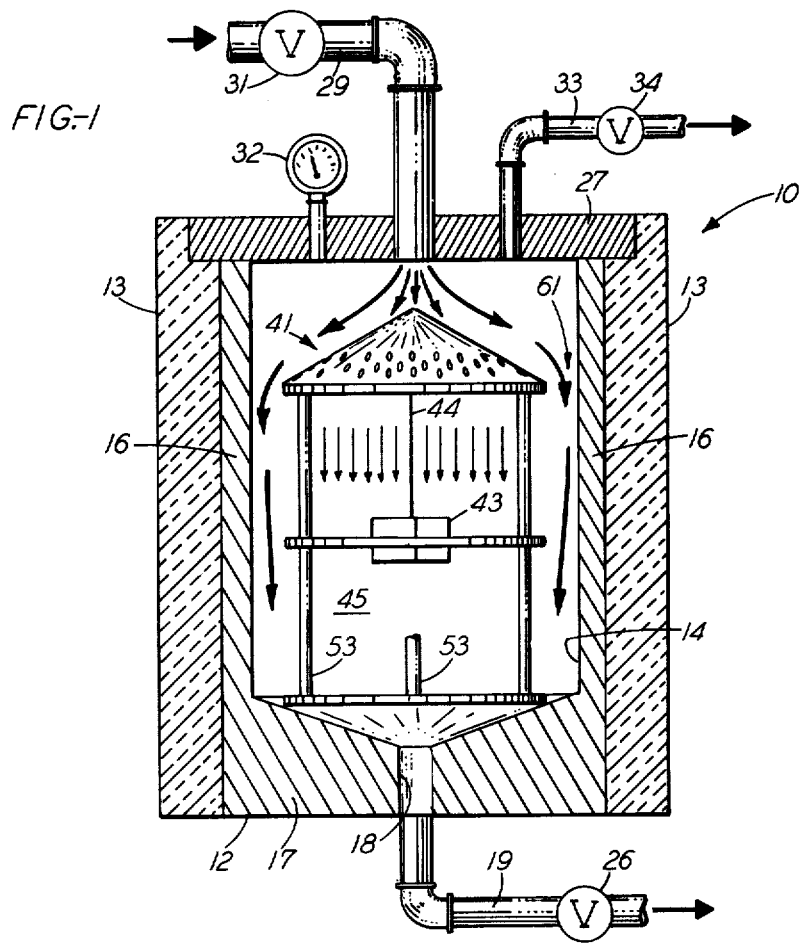
FIG. 1 is a partial cross-sectional view of the instant high pressure condensation soldering facility.

FIG. 1 is a partial cross-sectional view of the instant high pressure steam condensation soldering facility generally designated by the numeral 10. The system 10 is comprised of a cylindrical processing chamber 12 surrounded by fiberglass insulating material 13. The processing chamber 12 has an internal volume 14 defined by a circumferential cylindrical wall 16 and a base 17. A funnel shaped channel 18 passes through the base 17 and communicates with a drain conduit 19 having a first valve 26 therein.

Figure 2:
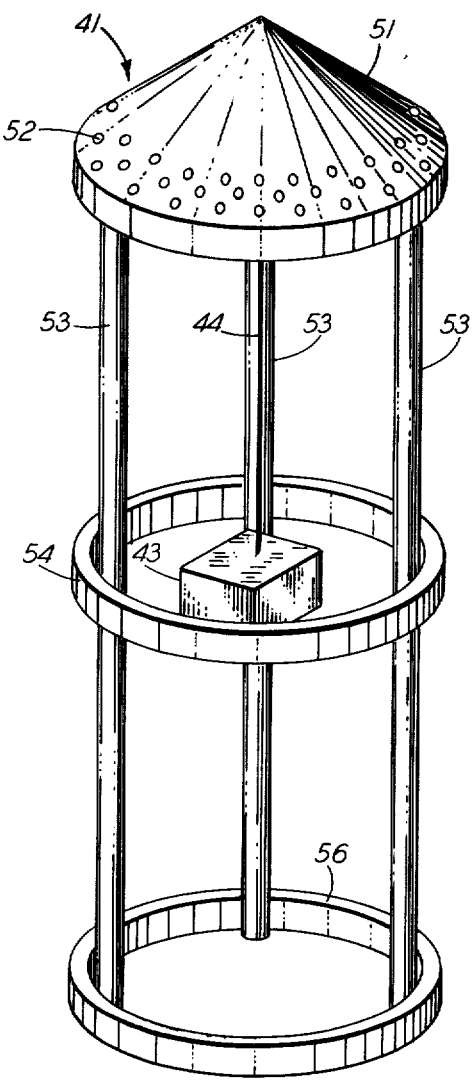
FIG. 2 is an isometric view of a baffle used to implement the instant invention.

A removable coverplate 27 also having the insulation 13 thereabout is removably affixed to the chamber 12 in a well known manner. A high pressure steam line 29, having a second valve 31 therein, passes through the central portion of the coverplate 27. Additionally, a pressure gauge 32 and a steam exhaust line 33 having a third valve 34 therein, are fixedly mounted on the coverplate 27 and communicate with the internal volume 14 of the chamber 12. Removably positioned within the processing chamber 12 is a steam injection baffle generally referred to by the numeral 41 which is shown in detail in FIG. 2 and will hereinafter be fully described. An article 43 to be soldered is shown suspended by a wire 44 from top of the baffle 41.

As hereinbefore indicated, it has been suggested in the prior art to reflow solder by placing an article 43 having predeposited solder (e.g., paste, perform or the like) thereon in a vessel such as chamber 12, without the baffle 41, and injecting high pressure steam therein via the high pressure steam line 29 by opening valve 31. The steam condenses on the article 43 and the predeposited solder, giving up its latent heat of vaporization thereto, and causes the solder to reflow. The valve 31 is then closed, valve 34 opened to reduce the pressure and temperature in the chamber 12 whereby the solder resolidifies to form a bond. The coverplate 27 is then taken off and the article 43 removed.

When attempting to implement such a technique without the baffle 41, shown in place in FIG. 1, it was found that as the pressurized steam enters the processing chamber 12 the high velocity steam jet impinges on the article 43 to be soldered. In one attempt the high pressure steam jet velocity was greater than 1500 ft. per sec. which levels off during the soldering processing interval to 300 ft. per second. The intensity of the jet was sufficient to move the article 43. Additionally, it was discovered that the inner surface of the wall 16 of the chamber 12 acts as a substantial heat sink which condenses large quantities of incoming steam vapor resulting in large temperature gradients within the internal volume 14 of the chamber 12. Both the movement of the article 43 and the large temperature gradients resulted in poor solder connections of the article.

The foregoing problems have been overcome by directing the steam into the chamber 12 in such a manner as to have a uniform flow pattern within a centrally located processing zone 45 while simultaneously forming a blanket or shield of steam between the wall 16 and the processing zone. Such a technique is implemented with the steam injection baffle 41 which is shown in detail in FIG. 2.

Figure 3:
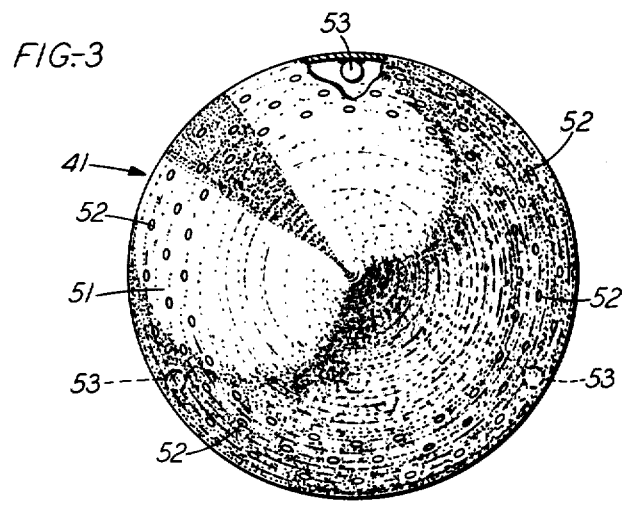
FIG. 3 is a top view of the instant baffle.

The baffle 41 is comprised of a conically shaped top portion 51 with a plurality of apertures 52—52 therein (see FIG. 3 for a top view) and three support members 53—53 held in spaced relation by first and second annular members 54 and 56, respectively. The processing zone 45 is substantially the centrally located cylindrical volume located directly under the top portion 51.

In operation the baffle 41 and the article 43 are placed in the internal volume 14 of the chamber 12 as shown in FIG. 1. The article 43 may be a single part or may be a basket or other carrier arrangement containing a plurality of individual devices to be soldered. Initially, valves 26, 31 and 34 are closed. The coverplate 27 is sealably placed on the chamber 12 and the valve 31 is opened, resulting in a jet of high pressure steam entering the chamber from a boiler (not shown). The steam impinges on the conical top portion 51 and passes through the apertures 52—52 which distributes the momentum of the incoming jet uniformly throughout the central processing zone 45 of the chamber 12 resulting in a substantially uniform temperature distribution of 420° F. at a pressure of approximately 310 p.s.i. within the processing zone 45 in an exemplary embodiment. Additionally, such uniform momentum substantially lessens the possibility of the steam moving the article 43.

In order to preserve the rapid heating characteristic of the condensing steam, vapor must be injected into the chamber 12 very rapidly. In a particular embodiment the total open area of the pattern of apertures 52—52 was twice the cross-sectional area of the high pressure steam line 29 in order to eliminate a major flow obstruction by the conical top portion 51. The line 29 was ⅜" O.D. stainless steel tubing with a 0.044 square inch internal cross-sectional area. The total open area of the apertures 52—52 was 0.086 square inch. These relative areas were found to ensure that the steam flow rate is established only by the pressure difference between the boiler (not shown) and the chamber 12 and is not severely retarded by the conical top portion 51.

A major requirement of steam condensation heat transfer is uniform heating of the processed parts. The pattern of the apertures 52—52 in the conical top portion 51 theoretically can maintain a substantially uniform vapor temperature within the processing zone 45. However, as hereinbefore indicated, the wall 16 of the chamber 12 acts as a heat sink to the hot (420° F.) vapor causing substantial temperature gradients within the chamber and particularly within the processing zone 45. To overcome this problem, the conical top portion 51 is so sized as to form a substantially annular gap 61 between the outer periphery of the top portion 51 and the inner surface of the wall 16. The gap 61 is designed to provide sufficient open area to enable a blanket or shield of steam to flow downward along the inner surface of the wall 16 to thermally isolate the wall from the processing zone 44 resulting in substantially uniform temperatures therein.

In the exemplary working embodiment the outer diameter of the conical top portion 51 was 2.85 inches and the inner diameter of the chamber 12 was 3.0 inches resulting in an area of 0.614 square inch for the annular gap 61 which was approximately seven times larger than the total area of the apertures 52—52. Advantageously, with the instant technique the processing zone 45 reached the soldering temperature in less than one second and maintained that temperature uniformly throughout the zone during the soldering reflow cycle of approximately 14 seconds.

Furthermore, when liquid droplets, formed by condensing vapor, land on parts being processed, poor heating, usually resulting in unacceptable solder connections, occur in the vicinity of such droplets. Droplets within the chamber 12 are formed by vapor condensing on the relatively cool inner surface of the coverplate 27. The upper surface of the conical top portion 51 diverts such droplets toward the gap 61 where they fall to the base 17 of the chamber 12 and pass through the channel 18 and out the conduit 19 along with other condensate following the completion of the solder reflow operation.

The ratio of closed surface area to the open aperture 52—52 area near the edge of the conical top portion 51 is kept relatively large (e.g., 33:1) to ensure that most of the droplets are blown toward the wall 16 of the chamber 12 rather than be blown through the apertures and into the processing zone 45. Additionally, the conical top portion 51 tapers off at approximately 30° to the horizontal to ensure that any droplets formed on the lower side of the conical top portion adhere to the underside thereof due to their surface tension and also flow toward the gap 61 and fall to the bottom of the chamber 12.

It is to be understood that the embodiments described herein are merely illustrative of the principles of the invention. Various modifications may be made thereto by persons skilled in the art which will embody the principles of the invention and fall within the spirit and scope thereof. For instance, although the baffle 41 redirects incoming high pressure vapor along the wall 16 of the chamber 12, one skilled in the art could direct the vapor from a separate source, downward, along the wall.

What is claimed is:

1. A method of forming a vapor processing zone, having a substantially uniform temperature distribution therein, within a high pressure steam condensation heating chamber for soldering, fusing or brazing an article therein, the method comprising the steps of:
   forming a shield of steam between the chamber wall and the vapor processing zone; and
   simultaneously directing high pressure steam into said processing zone at a temperature sufficient to solder, fuse or braze said article.

2. The method as set forth in claim 1, wherein:
   the high pressure steam is directed into the processing zone through a baffle having a plurality of apertures therein.

3. A method of soldering an article in a high pressure steam condensation soldering chamber, the method comprising:
   depositing a predetermined amount of solder on the article;

placing the article in said chamber under a conically shaped, apertured baffle;

directing high pressure steam through said apertures to condense said steam on the article and the solder to give up the latent heat of vaporization to reflow the solder; and decreasing the pressure and temperature to resolidify the solder on the article.

4. The method as set forth in claim 3, characterized by:

redirecting a portion of the steam along walls of the chamber to thermally isolate the walls from the volume under the baffle in which the article is being soldered.

5. A high pressure vapor condensation heating facility, comprising:

a chamber having a base, a circumferential sidewall and a coverplate thereon, the coverplate having a centrally located opening therein through which high pressure vapor is injected into said chamber; and a baffle means, having a conically shaped portion with a plurality of holes therein, mounted proximate the coverplate with the apex of the cone vertically aligned with the axis of the opening in the coverplate.

6. The facility as set forth in claim 5, wherein:

the periphery of the conically shaped portion is spaced from the chamber wall.

7. The facility as set forth in claim 5 or 6, wherein:

the ratio of the total area of the plurality of holes in the baffle to the centrally located opening in the coverplate is approximately 2:1.

* * * * *